March 21, 1967 S. L. SEYMOUR 3,310,273
SHEET SUPPORT APPARATUS
Filed Feb. 28, 1966
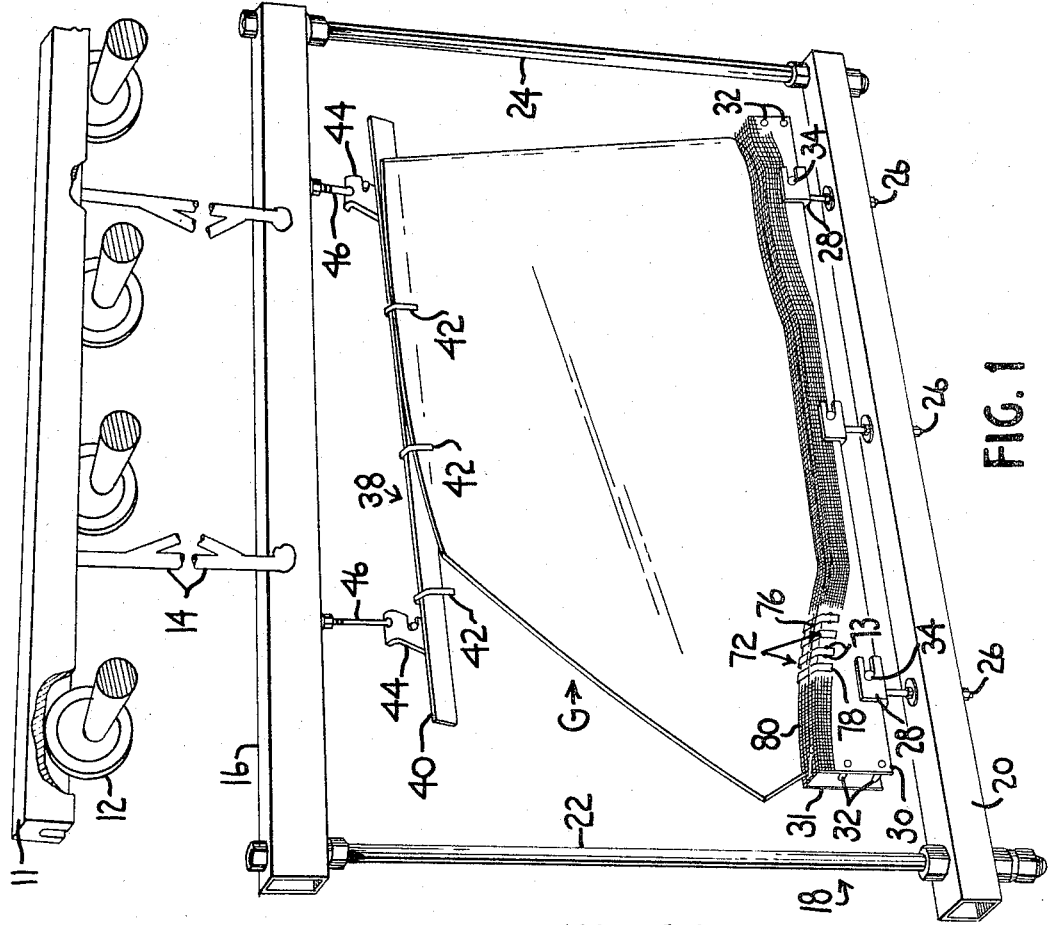
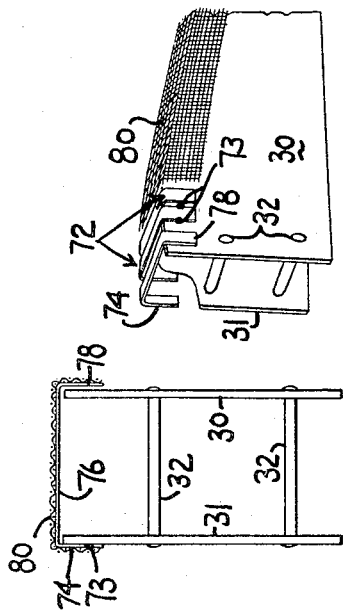
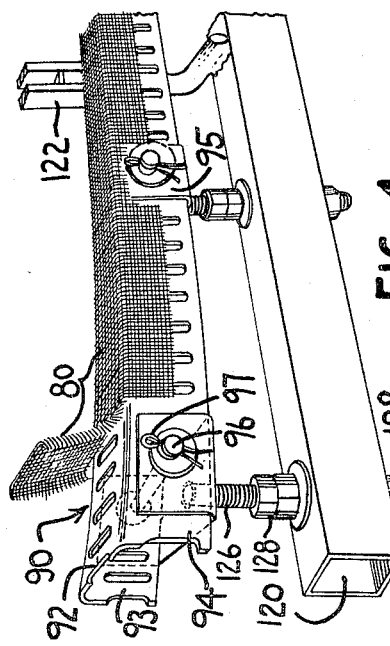
INVENTOR
SAMUEL L. SEYMOUR
ATTORNEYS

United States Patent Office 3,310,273
Patented Mar. 21, 1967

3,310,273
SHEET SUPPORT APPARATUS
Samuel L. Seymour, Oakmont, Pa., assignor to Pittsburgh Plate Glass Company, Pittsburgh, Pa., a corporation of Pennsylvania
Filed Feb. 28, 1966, Ser. No. 530,435
7 Claims. (Cl. 248—346)

This application is a continuation-in-part of application Ser. No. 424,533 of Samuel L. Seymour for "Sheet Support Apparatus."

The present invention relates to sheet support apparatus, and specifically to apparatus for supporting glass sheets for thermal treatment. While not exclusively designed therefor, the present invention particularly relates to supporting a glass sheet along its longest edge during a thermal treatment wherein the longest edge is non-linear. Such shapes are required for present-day automotive backlights to fit into the contour of the automobile.

The present apparatus is also suitable for supporting glass sheets along their longest edge during a shaping operation wherein the glass is heat-softened and shaped by pressurized engagement of its opposite major surfaces against a pair of shaping members having complementary shaping surfaces conforming to the shape desired for the glass. The present invention makes possible the thermal treatment of wider and heavier glass sheets than previously possible in presently existing tunnel-like furnaces having a vertically elongated opening for transporting glass sheets in an upright or in an oblique position during thermal treatment. The present invention extends the life of such furnaces by making them capable of fabricating large one-piece backlights with irregular bottom edges as well.

The present invention supports glass sheets in a vertical or oblique position by supporting its bottom edge and balancing the sheet in one or more regions spaced from the supported edge in a manner that avoids the use of glass gripping tongs. This manner of support avoids the marring of the optical properties of the glass sheets in the regions gripped by tongs resulting from the use of tongs. Tongs also tend to stress the glass locally in the vicinity of the tong gripping elements. The tong-induced stresses may induce fracture in the glass.

The present invention utilizes a novel combination of glass bottom edge supporting members that comprise elements previously used individually with varying degrees of success to support the bottom edge of relatively small glass sheets such as sidelights and vent panes. The composite bottom edge support of the present invention comprises a thin wire screen mesh in contact with the glass and relatively rigid reinforcing means comprising a series of metal strips or fingers intersecting the plane occupied by said glass sheet. In one embodiment, the relatively rigid reinforcement comprises a set of spaced fingers, each of which is attached at one end to one of a pair of laterally spaced, longitudinally aligned wall members and slidably supported by the upper edge surface of the other wall member laterally across the first wall member. A thin mesh screen rests on the set of fingers and is preshaped to conform to the shape of the upper edge surface of the spaced wall members.

A composite bottom edge support of less total thickness of screen and finger has been found to be capable of supporting greater widths and weights of glass sheets for thermal treatment than widths and weights carried by supports composed exclusively of either wire mesh alone or fingers alone having greater thickness. In addition, optical distortion along the supported regions is reduced drastically.

While the reasons for the unexpected improved operation are not entirely known, it has been theorized that the wire mesh screen and the spaced strips combine to support the bottom edge of glass sheets in a manner that optimizes the best features of either type of support and minimizes the worst features of either type of support, if used singly. The rigidity of the composite mesh and strips is derived mainly from the strips, yet the mesh spaces the strips from the bottom edge of the glass in such a manner as to permit freer access of air blasts to the supported glass edge than is the case when using either strips or mesh alone heavy enough to support the glass. In addition, the mesh bridges the gaps between adjacent fingers to provide short lengths of wire screen supports to replace the spaces between adjacent fingers.

In the past, the boundaries of the fingers served as origins of distortion when called upon to support glass having a mass more than ⅓ pound per inch of length. The present invention has made it possible to double the permissible mass of glass per unit length that can be treated without introducing objectionable edge distortion.

The present invention will be better understood in the light of a description of an illustrative embodiment which follows.

In the description of illustrative embodiments of the present invention and wherein like reference numbers refer to like structural elements, FIG. 1 is a perspective view of a glass supporting structure constructed according to the present invention with parts of the wire mesh broken away to show its supporting structure;

FIG. 2 is an enlarged fragmentary, cross-sectional view of a portion of the bottom edge supporting elements of the present invention;

FIG. 3 is an enlarged, fragmentary view of a portion of the supporting structure with parts of the structure broken away to show certain structural details; and FIG. 4 is an enlarged fragmentary view of another embodiment of the present invention.

The glass carrying apparatus shown in FIG. 1 comprises an upper inverted channel member 11 resting on stub rolls 12 and propelled along a horizontal path of a conveyor as the rolls 12 are rotated in unison. The glass supporting structure 14 extends downward from its upper portion, attached to the upper inverted channel member 11, to its lower portion, attached to an upper horizontal member 16 of a substantially rectangular frame 18. The depending frame structure 14 thus provides a rigid connection between the frame 18 and the inverted channel member 11.

The frame 18 comprises the upper horizontal member 16 and a lower horizontal member 20. Both of the horizontal members are preferably rectangular tubes having apertures in their upper and lower walls to receive the upper and lower end portions of a pair of vertical end members 22 and 24. The latter comprise rods which are externally threaded at their lower and upper ends to receive lock nuts to rigidly attach the upper and lower horizontal members 16 and 20 to one another to form the open rectangular frame 18. The latter provides a frame support for the glass supporting structure.

The lower horizontal member 20 is apertured to receive additional threaded rods 26. The threaded rods 26 support a series of slotted brackets 28. The latter support a pair of elongated vertical wall members 30 and 31 interconnected in spaced relation to one another by spacing elements 32 at their longitudinal extremities and intermediate spacing elements 34 that extend through the slots of the slotted brackets 28. The slotted brackets 28 support the elongated vertical wall members 30 and 31 in vertically spaced relation above the lower horizontal member 20. The elongated wall members 30 and 31 are located in spaced vertical planes and are identical in shape and aligned with one another along their entire length.

Elongated wall members 30 and 31 have straight horizontally extending bottom edges resting on a series of slotted brackets 28. The upper edges of the elongated wall members are shaped to conform to the shape of the bottom edge of a glass sheet G to be supported along its elongated bottom edge thereby.

A plurality of spaced fingers 72 is attached alternately to the outer sides of walls 30 and 31. Each finger 72 comprises one vertical flange 74 rigidly attached as by welding 73 to the outer side of one of the walls 30 or 31, a horizontal web section 76 extending horizontally between the upper edges of the walls and a free downwardly extending portion 78 bent over the outer surface of the outer wall member 30 or 31 at the opposite end from the rigidly attached end 74. Each of these flat metal strips is preferably of stainless steel and is ¼ inch in width and is spaced from one another approximately ¼ inch. Alternate fingers are welded to wall member 30 and wall member 31 alternately to provide free expansion and contraction as the glass supporting member undergoes a change in temperature. The plurality of fingers is preferably of a thickness less than .030 inch, preferably about .020.

A fine flexible square mesh screen 80 of inverted channel-shaped configuration is superimposed over the fingers 72 and wall members 30 and 31. The fine flexible screen is preferably of .020 inch diameter wires arranged in 16 square mesh arrangement and is preferably calendered. The screen fits loosely over the bent metal fingers 72. The composite causes better support and a better stress pattern for the suported bottom edge of a glass sheet than mesh of .040 inch diameter wire or spaced fingers of .040 inch thickness when either of the elements is used individually.

A mesh screen per se was not sufficient to support the glass without distortion and neither would the spaced fingers per se support the glass of the mass per unit length capable of being supported by the combination mesh screen and finger support presently disclosed. More uniform bending and more uniform stress patterns in the tempered bent backlights resulted from the use of the composite support as compared with individual support.

The apparatus also comprises balancing means 38 such as an elongated bar 40 extending horizontally in an oblique plane above the location of the bottom edge support. Spaced metal pins 42 are attached at their upper ends to the upper end of the oblique bar and extend downward in divergent relation to the oblique bar 40. At the upper edge of the glass sheet G, the fingers 42 are separated from the oblique bar 40 by a distance greater than the glass thickness. This enables the upper edge of the glass sheet to be in contact with the oblique bar and slanted slightly toward the oblique bar 40, as disclosed in application Ser. No. 289,326 to Herbert W. Barch et al., for Treating Glass, filed June 20, 1963, with its bottom edge supported by the composite bottom edge support provided by the spaced fingers 72 and the inverted channel screen 80. This tilted orientation exists during the heating phase of the operation.

The glass is pivoted to the other side of the vertical plane of support passing through its supported bottom edge to contact spaced pins 42 in spaced relation to the oblique bar when the glass is cooled following its heating and/or bending operation. The oblique bar 40 and the pins 42 are attached to the upper horizontal member 16 in vertically spaced relation therebelow by brackets 44 each having a rod externally threaded at its margin to be locked in positive relation to the upper horizontal member 16.

The upper and the lower horizontal members 16 and 20 of frame 18 are sufficiently rigid to prevent warping the frame, yet their hollow rectangular shape makes them sufficiently light to minimize heat wasted in the furnace by absorption by relatively massive glass supporting apparatus rather than the glass.

While the above-described embodiment was used for bending automobile sidelights having nonlinear edges, the present invention has also been used to support backlights having nonlinear longitudinal edges. The nonlinear bottom edge of backlights bent and tempered using apparatus constructed according to the present invention was supported by a composite of screen and flexible fingers which imparted rigidity to the screen.

In a particular embodiment of the present invention, glass sheets were supported by a 16 by 16 mesh screen of type 304 stainless steel of .020 inch diameter wire resting on a plurality of type 304 stainless steel fingers ¼ inch wide and .020 inch thick. Glass sheets cut to outline required for tempered curved backlights weighing 28 pounds and 46 inches long along their supported bottom edge were loaded on composite supports, and conveyed through a tunnel-like furnace while supported on edge during a heating step lasting 4½ minutes to reach a surface temperature of 1220 degrees Fahrenheit plus or minus 5 degrees. The heated glass was shaped in pressurized contact between opposed shaping members having complementary shaping surfaces and immediately chilled by applying air blasts at a pressure of 3½ ounces per square inch against the concave glass surface and 4 ounces per square inch against the convex glass surface through plenum orifices spaced 5 inches apart and equidistant from the path of glass sheet movement.

The composite of spaced flexible fingers ¼ inch wide spaced from one another ¼ inch in combination with metal screen provided a support for heavier and higher glass sheets than the support provided by the apparatus of the prior art which included flexible fingers exclusively or wire mesh exclusively.

The flexible finger support of the prior art was suitable for supporting masses of glass having a mass up to about ⅓ pound per inch of supported length. The support described above was useful for supporting backlights weighing 28 pounds and 46 inches in length. Thus, the present invention is capable of supporting glass having a mass per unit length more than .6 pound per inch of length.

In addition, the backlights bent and tempered while supported along their elongated edges on supporting devices of the present invention had a higher compressive stress along their supported edge and a smaller average of maximum composite tension stresses in the vicinity of the supported bottom edge than those treated in the prior art. Since glass is notoriously strong in compression and weak in tension, the strength of the supported edge is a function of the average edge compression stress and its weakness a function of its average of maximum composite tension stress through its thickness in the vicinity of the supported edge.

Previous experiments have indicated that spaced finger supports .050 inch in thickness, ¼ inch wide, and spaced ¼ inch from one another supported glass of ¼ inch nominal thickness having a vertical height of 13½ inches maximum without causing objectionable bottom edge distortion. The present apparatus supported glass 19½ inches high of the same thickness without causing objectionable bottom edge distortion, whereas the prior art supports induced objectionable optical distortion in glass sheets of such height.

Glass sheets weighing as much as one pound per inch of length can be supported without introducing objectionable distortion using fingers .040 inch thick with thin wire mesh providing 45 percent or more open space. For example, 16 by 16 square mesh wire cloth of .020 inch diameter wire or 18 by 18 mesh of .018 inch diameter wire or 15 by 15 mesh of .022 inch diameter wire or 14 by 14 mesh of .023 inch diameter wire or 13 by 13 mesh of .025 inch diameter wire or 12 by 12 mesh of .027 inch diameter wire operates satisfactorily to support such mass per unit length when supported by spaced fingers.

Since glass is notoriously strong when stressed in compression and weak when stressed in tension, it is desirable to produce glass having large compression stress along the edge where it is exposed to stresses of handling and installation. At the same time, it is desired to limit the maximum tension stress in the glass.

The stress pattern was improved along an edge supported on the composite support suggested by the present invention. The average edge compression was 8,000 pounds per square inch along the supported bottom edge and the maximum average interior composite tension stress through the thickness adjacent the supported edge was 1,050 pounds per square inch. This compared with an average of 8,400 pounds per square inch of compression stress along the supported edge accompanied by 1,566 pounds per square inch average maximum composite tension stress in glass sheets treated while supported directly in contact with flexible finger supports and with 6,398 pounds per square inch average edge compression stress and 2,643 pounds per square inch average maximum composite tension stress for glass sheets treated with an edge support directly in contact with a wire screen support.

Furthermore, the distortion in the optical properties of the supported edge was considerably better using the composite support of the present invention compared to the support provided by the prior art when treating sheets of the same pattern.

It is understood that the glass sheet may be held upright or in any oblique plane while supported along its bottom edge by the aforesaid composite support by means other than the balancing means described above. For example, moving fluid may be used to balance the glass in a vertical or oblique plane while supported on its lower nonlinear edge on a composite support described hereinabove. Furthermore, the bottom composite support may comprise a series of short, inverted channel-shaped members of screen material that are closely spaced from one another and rest on top of a series of fingers in lieu of a single channel-shaped screen 82 when the curvature of the bottom edge is too radical to shape a single sheet of screening into conformance therewith.

The above description represents the first stage of development of the present invention as described and claimed in application Ser. No. 424,533, filed Jan. 11, 1965. It has now been discovered that the composite support of a wire screen in contact with the supported edge of the glass and a rigid, perforated reinforcement can be made capable of supporting glass sheets as high as 24 to 30 inches without introducing edge weakening stresses of a magnitude that cannot be tolerated in production.

In FIG. 4, a metal screen mesh 80 of another embodiment is superimposed over an inverted channel member 90 of slotted metal. The channel member 90 (partly exposed in FIG. 4) comprises a horizontal web 92 and spaced vertical walls 93 and 94 extending downward therefrom. A series of U-shaped brackets 95 are disposed in spaced relation along the length of inverted channel member 90 and secured by pins 96 extending through walls 93 and 94 and elongated apertures in the walls of the brackets 95. Cotter pins 97 hold the pins in place. The brackets 95 are welded to the upper ends of threaded rods 126 (identical to rods 26 of the first embodiment). Adjustment nuts 128 are threaded around the lower end of the threaded rods 126 above and below the horizontal member 120 to adjust the vertical distance between the inverted channel member 90 and member 120. In FIG. 4, the horizontal members of the frame 18 are interconnected intermediate their ends by vertically extending connecting brackets 122. This reduces the total space occupied by the glass and the frames and increases furnace capacity.

The inverted channel members 90 are preferably fabricated from sheets of type 302 stainless steel 3½ inches wide and ⅛ inch thick or less. Rows of 3 slots each ¾ inch long and ¼ inch wide were punched across the width of a sheet of type 302 stainless steel .090 inch thick at spacings of ¼ inch between slots lengthwise of the metal sheet. The outermost slots were spaced laterally inward ¼ inch from the outer edges of the sheet and the center slots of each row were disposed centrally of the sheet. All the slots extended in the direction of the sheet width.

After the sheet was slotted, it was bent about its transverse axis to conform to the shape of the supported edge of a backlight to be fabricated. Then the sheet was folded about two parallel lines extending longitudinally of the sheet 1¼ inches transversely inward of the longitudinal side edges of the sheet to form a slotted channel shaped member whose web 92 was 1 inch wide and whose longitudinally extending end walls were 1¼ inches high. U-shaped brackets were secured to the channel at spaced points therealong and the brackets secured in spaced relation to the lower horizontal member 120. A screen of 16 mesh square weave .020 inch thick was superimposed on the channel and sheets ⁷⁄₃₂ inch thick of commercial float glass of soda-lime-silica composition were cut to pattern (about 24 inches by 72 inches) and supported in a slightly oblique plane for conveyance through a furnace, a press bending station and between a pair of spaced nozzle housings. After 4 minutes of heating in the furnace, the glass reached a temperature of 1250 degrees Fahrenheit and was immediately transferred outside the furnace to a glass shaping station where the glass was held in pressurized engagement for one second and then immediately passed between nozzle orifices spaced 5 inches apart and subjected to opposed air blasts at a pressure of 5½ ounces per square inch against the concave glass surface and 6 ounces per square inch against the convex glass surface, the pressures being measured at the nozzle orifices. The air blasts were applied throughout the extent of the glass, except for the lowest 3 inches. This resulted in a downward flow of diverted air blasts past the lower supported glass edge.

Additional glass sheets were similarly treated, except that the time of exposure in the furnace was changed so that different glass sheets were removed at temperatures ranging from 1245 to 1230 degrees Fahrenheit. In a pilot plant test, only 1 sheet out of 5 was broken and 4 successfully press bent and tempered.

In regular production, random production samples were measured for stress along and slightly inward of the supported edge. The lowest compression edge stress measured was 7400 pounds per square inch and the highest tension stress measured was 400 pounds per square inch during the first day's run.

The additional experience gained with the composite glass edge supports comprising fine wire mesh screen contacting the glass edge and supported by reinforcements of apertured inverted channel shaped members indicates that thicknesses up to ⅛ inch for the channel members may be used to reinforce the screens and still provide better optical properties and stronger edges as determined by edge stress measurements than by screens alone heavy enough to support the glass sheet without substantial deformation or apertured sheets alone shaped in whatever way desired for structural rigidity and thick enough to support the glass sheet width and still retain its shape.

The form of the invention described in this disclosure represents an illustrative preferred embodiment thereof. The apertured reinforcement may be apertured by holes of any desired outline as well as elongated slots to permit relatively free flow of air blasts past the supported edge. The combination of an open mesh screen to permit maximum air flow and an apertured member to provide structural rigidity to the screen while minimizing its interference to air flow permitted by the open mesh screen is the crux of the present invention. It is understood that various other changes may be made without departing from the spirit of the invention as defined in the claimed subject matter which follows.

What is claimed is:

1. Apparatus for supporting a glass sheet along a supported edge thereof comprising thin wire screen mesh in contact with said supported edge and relatively rigid reinforcing means contacting said thin wire screen on the side opposite said glass contacting side of said screen, said relatively rigid reinforcing means comprising a perforated, flatwise disposed metal sheet intersecting the plane occupied by said glass sheet.

2. Apparatus as in claim 1, wherein said sheet is in the form of an inverted channel member having an apertured web portion forming longitudinally spaced strips intersecting the plane occupied by said glass sheet.

3. Apparatus as in claim 2 for supporting a rigid sheet in a substantially vertical plane, said relatively rigid reinforcing means comprising a pair of elongated wall members spaced transversely from one another along their length and having upper edge surfaces conforming to one another, said strips comprising a set of fingers, each attached at one end to one of said elongated members and extending in a direction transverse to the length of said elongated wall members over the upper edges of said elongated wall members with its other end loosely fitting over the upper edge of the other elongated wall member, said open mesh screen of thin wire being superimposed on said set of fingers, whereby the glass is supported along its bottom edge on said screen and in spaced relation to said fingers and said fingers impart rigidity to said screen, and means for balancing the glass sheet in an upright position.

4. Apparatus as in claim 3, wherein said elongated wall members have nonlinear upper edge surfaces conforming to the shape of an edge of a glass sheet to be supported.

5. Apparatus as in claim 3, wherein said open mesh screen consists of a plurality of screen elements in the form of inverted channel members, each superimposed on a different portion of said fingers and of said elongated wall members.

6. In apparatus for supporting glass sheets in an upright position, the improvement in bottom edge support structure comprising thin wire mesh in contact with the bottom edge of the glass sheet, spaced, flat, metal fingers having greater rigidity than said thin wire mesh supporting the thin wire mesh and rigid, spaced, elongated wall members having upper edges supporting the fingers along the length of said wall members.

7. The improvement according to claim 6, wherein said wall members have upper finger support surfaces of irregular shape conforming to the irregular shape of an edge of said glass sheet to be supported thereby.

References Cited by the Examiner
UNITED STATES PATENTS
2,263,005  11/1941  McClure.
3,220,817  11/1965  Malobicky et al. _____ 65—104

HUGO O. SCHULZ, *Primary Examiner.*